United States Patent
Oba et al.

(10) Patent No.: US 9,140,210 B2
(45) Date of Patent: Sep. 22, 2015

(54) JET FLOW NOZZLE AND JET ENGINE

(75) Inventors: Yoshinori Oba, Tokorozawa (JP); Tsutomu Oishi, Tokyo (JP); Nozomi Tanaka, Tokyo (JP); Shinya Kusuda, Tokyo (JP)

(73) Assignee: IHI CORPORATION (JP)

( * ) Notice: Subject to any disclaimer, the term of this patent is extended or adjusted under 35 U.S.C. 154(b) by 319 days.

(21) Appl. No.: 13/639,621

(22) PCT Filed: Oct. 20, 2010

(86) PCT No.: PCT/JP2010/068471
§ 371 (c)(1),
(2), (4) Date: Nov. 29, 2012

(87) PCT Pub. No.: WO2011/125248
PCT Pub. Date: Oct. 13, 2011

(65) Prior Publication Data
US 2013/0086907 A1 Apr. 11, 2013

(30) Foreign Application Priority Data
Apr. 9, 2010 (JP) ................ P2010-090480

(51) Int. Cl.
*F02K 1/08* (2006.01)
*F02K 1/38* (2006.01)
*F02K 1/46* (2006.01)
*F02K 1/48* (2006.01)
(Continued)

(52) U.S. Cl.
CPC ... *F02K 1/48* (2013.01); *F02C 7/00* (2013.01); *F02C 7/045* (2013.01); *F02K 1/08* (2013.01); *F02K 1/386* (2013.01); *F02K 1/46* (2013.01); *F05D 2240/127* (2013.01); *F05D 2250/61* (2013.01); *F05D 2260/14* (2013.01); *Y02T 50/671* (2013.01)

(58) Field of Classification Search
CPC ............ F02K 1/386; F02K 1/08; F02C 7/045
USPC .................. 60/770, 771; 239/265.27, 265.19; 181/213, 220
See application file for complete search history.

(56) References Cited

U.S. PATENT DOCUMENTS

| 2,934,889 | A | | 5/1960 | Poulos |
| 6,082,635 | A | * | 7/2000 | Seiner et al. ............. 239/265.19 |
| 6,360,528 | B1 | * | 3/2002 | Brausch et al. ................. 60/262 |

(Continued)

FOREIGN PATENT DOCUMENTS

| CA | 2673001 A1 * | 6/2008 | ............... F02C 1/48 |
| EP | 1 191 214 A2 | 3/2002 | |

(Continued)

OTHER PUBLICATIONS

International Search Report and Written Opinion mailed Dec. 28, 2010 in corresponding PCT International Application No. PCT/JP2010/068471.
Brenton Greska et al., "The Effects of Microjet Injection on an F404 Jet Engine," 11th AIAA/CEAS Aeroacoustics Conference (26th AIAA Aeroacoustics Conference), 23 pages, May 23-25, 2005, Monterey, California, AIAA 2005-3047.

(Continued)

*Primary Examiner* — Phutthiwat Wongwian
*Assistant Examiner* — William Breazeal
(74) *Attorney, Agent, or Firm* — Ostrolenk Faber LLP

(57) ABSTRACT

The present invention relates to a jet engine including protrusions (1) for preventing the increase of the velocity gradient of a fluid in a mixed layer of a jet flow and an external air flow by bending the mixed layer, when viewed from the side of a jet flow injected.

13 Claims, 9 Drawing Sheets

(51) Int. Cl.
*F02C 7/00* (2006.01)
*F02C 7/045* (2006.01)

(56) References Cited

U.S. PATENT DOCUMENTS

| | | | | |
|---|---|---|---|---|
| 2007/0023571 | A1 | 2/2007 | Kawai et al. | 244/119 |
| 2007/0033922 | A1* | 2/2007 | Reba et al. | 60/262 |
| 2009/0320486 | A1 | 12/2009 | Gutmark et al. | |
| 2010/0032497 | A1 | 2/2010 | Rose et al. | 239/265.11 |

FOREIGN PATENT DOCUMENTS

| | | |
|---|---|---|
| FR | 2 930 972 | 11/2009 |
| JP | 2000-080958 | 3/2000 |
| JP | 2003-172205 | 6/2003 |
| WO | WO 2008/075671 | 6/2008 |
| WO | WO 2008/100712 A2 | 8/2008 |
| WO | WO 2008/100712 A3 | 8/2008 |

OTHER PUBLICATIONS

Thomas Castelain et al., "Effect of Microjets on a High-Subsonic Jet. Parametric Study of Far-Field Noise Reduction," 12th AIAA/CEAS Aeroacoustics Conference (27th AIAA Aeroacoustics Conference), 11 pages, May 8-10, 2006, Cambridge, Massachusetts, AIAA 2006-2705.

Thomas Castelain et al., "Jet Noise Reduction by Impinging Microjets: an Aerodynamic Investigation Testing Microjet Parameters," 13th AIAA/CEAS Aeroacoustics Conference (28th AIAA Aeroacoustics Conference), 15 pages, May 21-23, 2007, Rome, Italy, AIAA 2007-3419.

Canadian Office Action dated Aug. 27, 2014 in corresponding Canadian Patent Application No. 2,795,710.

Extended European Search Report dated Aug. 29, 2014 in corresponding European Patent Application No. 10849488.1.

* cited by examiner

|  | ENGINE SIDE | DOWNSTREAM FROM ENGINE | THRUST LOSS |
|---|---|---|---|
| NOZZLE INCLUDING MIXER | SMALL EFFECT | LARGE EFFECT | LARGE |
| NOZZLE OF PRESENT EMBODIMENT | LARGE EFFECT | SMALL EFFECT | SMALL |

JET FLOW NOZZLE AND JET ENGINE

CROSS-REFERENCE TO RELATED APPLICATIONS

The present application is a 35 U.S.C. §§371 national phase conversion of PCT/JP2010/068471, filed Oct. 20, 2010, which claims priority of Japanese Patent Application No. 2010-090480, filed Apr. 9, 2010, the contents of which are incorporated herein by reference. The PCT International Application was published in the Japanese language.

TECHNICAL FIELD

The present invention relates to a jet flow nozzle and a jet engine.

BACKGROUND ART

From the related art, the reduction of noise due to a jet flow injected from a jet flow nozzle has been proposed in a jet engine.

For example, Patent Document 1 discloses a jet flow nozzle which includes a mixer serving as an obstacle for a flow path of the jet flow. The jet flow nozzle including the mixer slows down the jet flow (a core flow) injected via a nozzle outlet end by the mixer, makes the velocity of the jet flow close to that of an external air flow, facilitates the mixing of the jet flow and the external air flow, and promotes the reduction of noise.

More specifically, by facilitating the mixing of the jet flow and the external air flow, a vortex formed near the nozzle outlet end is finely dispersed, the occurrence of a large vortex serving as a main cause of noise is suppressed, and the reduction of noise is promoted.

However, an effect of noise reduction of the jet flow nozzle including the mixer described in Patent Document 1 was not sufficient.

Thus, as described in Non-Patent Documents 1 to 3, a method of promoting the reduction of noise by placing a plurality of micro jet nozzles around the nozzle outlet end and injecting the air flow from the micro jet nozzles toward the core flow has been suggested.

PRIOR ART DOCUMENT

Patent Document

[Patent Document 1] Japanese Unexamined Patent Application, First Publication No. 2003-172205

[Non-Patent Document 1] Brenton Greska, Anjaneyulu Krothapalli, Jhon M. Senier, Bernard Jansen, Lawrence Ukeiley, [The Effects of Microjet Injection on an F404 Jet Engine], 11$^{th}$ AIAA/CEAS Aeroacoustics Conference (26$^{th}$ AIAA Aeroacoustics Conference) 23-25 May 2005, Monterey, Calif., AIAA 2005-3047.

[Non-Patent Document 2] Thomas Castelain, Michel Sunyach, Daniel Juve, [Effect of Microjets on a High-Subsonic Jet], 12$^{th}$ AIAA/LEAS Aeroacoustics Conference (27$^{th}$ AIAA Aeroacoustics Conference) 8-10 May 2006, Cambridge, Mass., AIAA 2006-2705.

[Non-Patent Document 3] Thomas Castelain, Michel Sunyach, Daniel Juve, [Jet Noise Reduction by Impinging Microjets: an Aerodynamic Investigation Testing Microjet Parameters], 13$^{th}$ AIAA/CEAS Aeroacoustics Conference (28$^{th}$ AIAA Aeroacoustics Conference) 21-23 May 2007, Rome, Italy, AIAA 2007-3419.

SUMMARY OF THE INVENTION

Problems to be Solved by the Invention

However, the present inventors have found that the law of noise reduction using the micro jet nozzle is different from the law of noise reduction of the jet flow nozzle including the mixer.

More specifically, the law of noise reduction in the jet flow nozzle including the mixer is to promote the slow-down of the jet flow by blocking the jet flow by the mixer as mentioned above, facilitate the mixing of the jet flow and the external air flow, finely disperse the vortex formed near the nozzle outlet end, and thereby suppress the occurrence of the large vortex serving as the main cause of noise.

On the other hand, in a case of using the micro jet nozzle, a mixed layer of the jet flow injected from the nozzle outlet end and the external air flow is bent by the air flow injected from the micro jet nozzle, and thus the mixed layer viewed from the jet flow injecting side can appear to be formed thickly. If the mixed layer is thin, the high-velocity jet flow is mixed with the low-velocity external air flow in a narrow region, the velocity gradient is rapidly increased, and thus shear force in the mixed layer due to the velocity gradient becomes stronger. However, the mixed layer viewed from the jet flow injecting side becomes thicker, the jet flow is mixed with the external air flow in a wide region, the velocity gradient in the mixed layer becomes gentle, an increase in velocity gradient is prevented, and shear force in the mixed layer is reduced.

In addition, the vortex formed near the nozzle outlet end grows significantly with the strength of shear force in the mixed layer. Herein, in the case of using the micro jet nozzle, since the shear force in the mixed layer is reduced, the growth of a vortex is suppressed, and as a result, it is possible to suppress the occurrence of a large vortex serving as the main cause of noise.

That is, the law of noise reduction using the micro jet nozzle is to promote the reduction of shear force in the mixed layer by bending the mixed layer of the jet flow and the external air flow, suppress the growth of a vortex formed near the nozzle outlet end, and thereby suppress the occurrence of a large vortex serving as the main cause of noise.

In the method of reducing the noise using the micro jet nozzle, it has been demonstrated that the effect of reducing the noise is higher than in the case of using the jet flow nozzle including the mixer.

However, when the method of reducing the noise using the micro jet nozzle is adopted, there is a need to bleed the air flow for being injected from the micro jet nozzle from the inside of the jet engine. Specifically, a configuration in which high-pressure air is bled from a fan or compressor included in the jet engine and is injected from the micro jet nozzle is adopted.

For this reason, the structure of the jet engine is complicated, and the maintenance thereof becomes cumbersome.

Furthermore, the weight of the jet engine is increased due to a pipe or the like that is a flow path of the bled high-pressure air, and an amount of high-pressure air to be supplied to a combustor is reduced by bleeding the high-pressure air. For this reason, there is a problem that leads to thrust loss.

In addition, even when the jet flow nozzle including the mixer is used, since the jet flow slows down, reaction force obtained by the injection of the jet flow is reduced, which leads to the thrust loss.

Furthermore, although this is common to the case of using the jet flow nozzle including the mixer and the case of using the micro jet nozzle, a turbulence in the mixed layer near the nozzle outlet end and Reynolds stress are locally increased by the air flow injected from the mixer or the micro jet, thereby creating a new noise source in the high-frequency region.

The noise which has been an issue in the past is one of a low-frequency region, and the influence of the noise source newly created in the high-frequency region is smaller than such noise. However, there is also a possibility of the noise of the high-frequency region standing out as such noise is reduced, and thus there is a need to reduce the noise of the high-frequency region.

The present invention has been achieved in view of the above circumstances, and an object of the present invention is to provide a jet engine capable of realizing a reduction of noise greater than or equal to the case of using the micro jet nozzle by a simple configuration, and reducing thrust loss.

Means for Solving the Problem

According to a first aspect of the present invention, there is provided a jet flow nozzle mounted on a jet engine and configured to inject a jet flow to the outside which includes protrusions that prevent an increase in velocity gradient of a fluid in a mixed layer of the jet flow and the external air flow by bending the mixed layer, when viewed from a jet flow injecting side.

According to a second aspect of the present invention, multiple protrusions are provided in plural numbers around a nozzle outlet end from which the jet flow is injected, and the mixed layer is placed in all areas of the entire circumference, when viewed from the jet flow injecting side.

According to a third aspect of the present invention, at least six protrusions are provided around the nozzle outlet end from which the jet flow is injected. Eighteen to twenty-four protrusions may be provided around the nozzle outlet end from which the jet flow is injected.

According to a fourth aspect of the present invention, the protrusions are provided so as to radially protrude toward the center of the nozzle outlet end when viewed from the jet flow injecting side, and are provided with grooves that continue to the nozzle outlet end on the outside of the protrusions in the radial direction.

According to a fifth aspect of the present invention, heights of the protrusions are greater than a thickness of the mixed layer at the nozzle outlet end.

According to a sixth aspect of the present invention, the heights of the protrusions are 2.5 to 3.0% of a diameter of the nozzle outlet end.

According to a seventh aspect of the present invention, there is provided a jet engine including a jet flow nozzle which injects a jet flow to the outside, wherein the jet engine includes the jet flow nozzle according to any one of the first to sixth aspects as the jet flow nozzle.

Effects of the Invention

According to the present invention, the mixed layer of the jet flow and the external air flow is bent by the protrusions, when viewed from the jet flow injecting side, the velocity gradient of the fluid in the mixed layer becomes gentle, and thus it is possible to prevent an increase in velocity gradient. For this reason, as in the law of the noise reduction using the micro jet nozzle, by bending the mixed layer of the jet flow and the external air flow, a reduction of shear force in the mixed layer is promoted, the growth of a vortex formed near the nozzle outlet end is suppressed, and thereby it is possible to suppress the occurrence of a large vortex that is a main cause of noise. That is, according to the present invention, it is possible to reduce the low-frequency noise that has been emitted in the past in the same manner as in the micro jet nozzle.

Furthermore, although it will be described later using a simulation result, according to the present invention, maximum turbulent kinetic energy in the mixed layer near the nozzle outlet end is reduced, and thus, it is possible to reduce high-frequency noise as compared to using the jet flow nozzle including the mixer or using the micro jet nozzle.

Thus, according to the present invention, as in the case of using the micro jet, low frequency noise is reduced, and high frequency noise can be reduced as compared to using the jet flow nozzle including the mixer or using the micro jet nozzle. Thus, it is possible to realize a reduction of noise greater than or equal to the case of using the micro jet nozzle.

Furthermore, according to the present invention, the reduction of noise is realized by the protrusions. For this reason, the reduction of noise can be promoted by a simpler configuration than in the case of using the micro jet nozzle.

In addition, the reduction of noise is realized by the protrusions, there is no need to bleed the high-pressure air from the jet engine, and thus it is possible to eliminate the cause of the thrust loss when of using the micro jet nozzle. Furthermore, in the present invention, since the reduction of noise is promoted by bending the mixed layer, there is no need to slow down the jet flow, and it is also possible to eliminate the cause of thrust loss in the case of using the jet flow nozzle including the mixer.

As mentioned above, according to the present invention, in the jet engine, it is possible to realize the reduction of noise greater than or equal to the case of using the micro jet nozzle by the simple configuration, and reduce the thrust loss.

MODES FOR CARRYING OUT THE INVENTION

Figure 1:
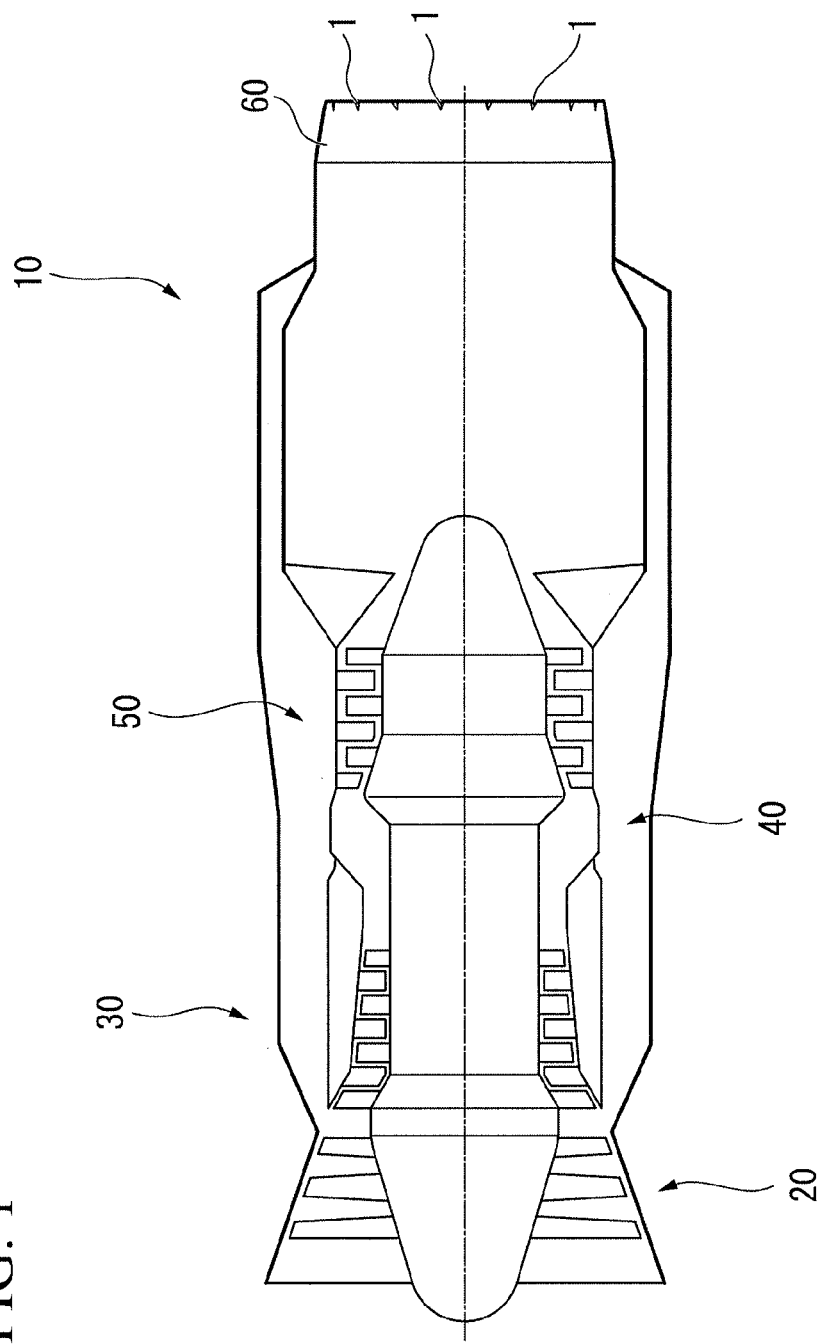
FIG. 1 is a cross-sectional view showing a schematic configuration of a jet engine according to an embodiment of the present invention.

Hereinafter, an embodiment of a jet injection nozzle and a jet engine according to the present invention will be described with reference to the accompanying drawings. In addition, in the drawings mentioned below, in order to show each member in a recognizable size, scales of each member are suitably changed.

FIG. 1 is a cross-sectional view showing a schematic configuration of a jet engine 10 of the present embodiment.

As shown in FIG. 1, the jet engine 10 of the present embodiment includes a fan 20, a compressor 30, a combustor 40, a turbine 50 and a jet flow nozzle 60.

The fan 20, the compressor 30, the combustor 40, the turbine 50 and the jet flow nozzle 60 are arranged in a flow direction of air.

The fan 20 captures air from the outside into the inside of the jet engine 10. The fan 20 is driven by the transmission of power from the turbine 50 placed in the subsequent stage.

The compressor 30 compresses air captured by the fan 20. The compressor 30 is driven by the transmission of power from the turbine 50 placed in the subsequent stage, in the same manner as the fan 20.

The combustor 40 generates the high temperature and high pressure gas by mixing the air compressed by the compressor 30 with fuel and combusting the mixture.

The turbine 50 converts part of energy of the high temperature and high pressure gas supplied from the combustor 40 into rotational power. The turbine 50 is mechanically connected to the fan 20 and the compressor 30.

The jet flow nozzle 60 injects the high temperature and high pressure gas supplied via the turbine 50 as the jet flow to the outside.

Figure 2A:
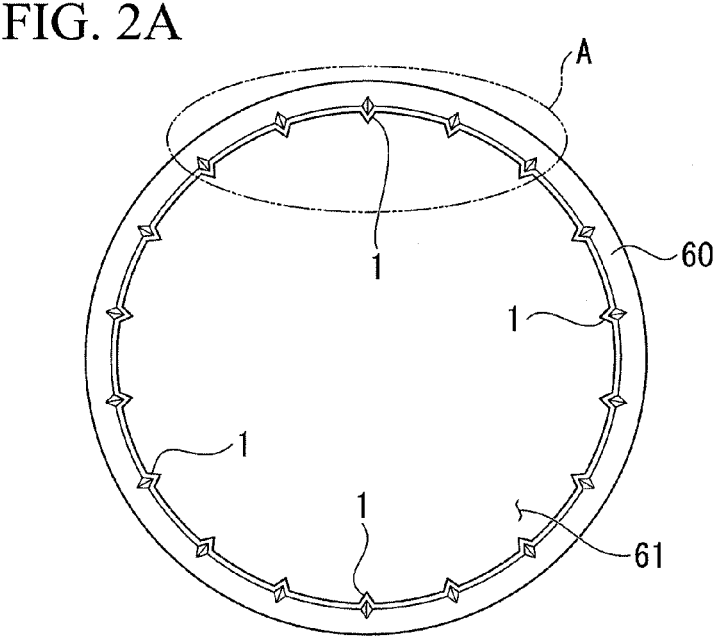
FIG. 2A is diagram in which a jet flow nozzle included in the jet engine according to an embodiment of the present invention is viewed from a jet flow injecting side.
Figure 2B:
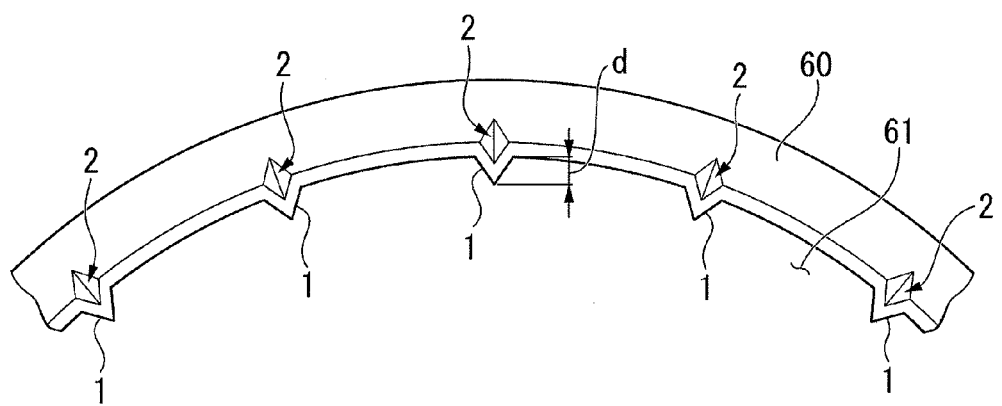
FIG. 2B is an enlarged view of a region A in FIG. 2A.
Figure 3:
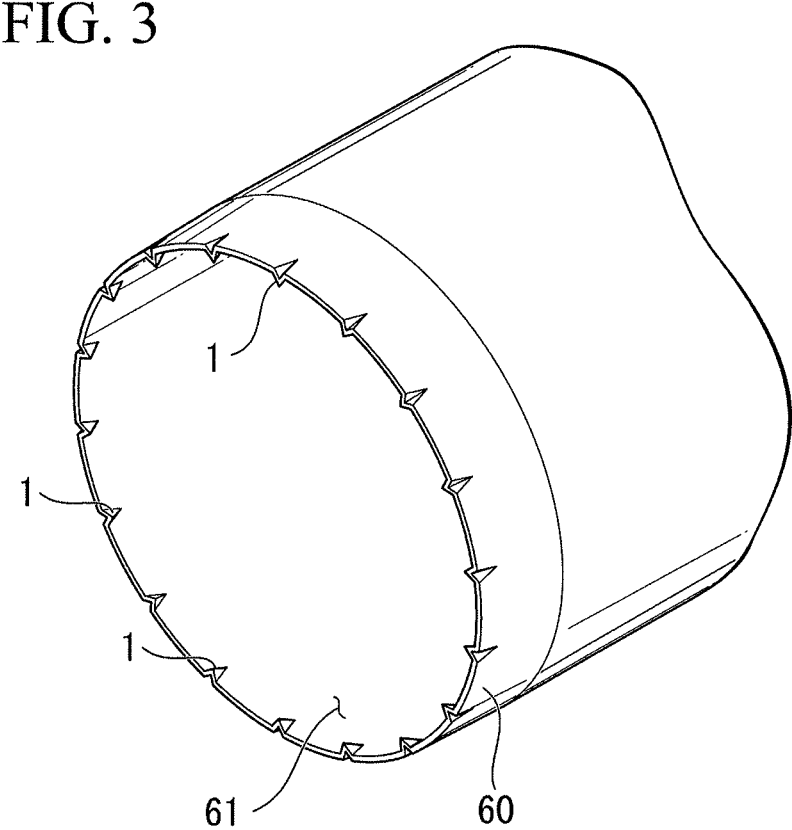
FIG. 3 is a perspective view of the jet flow nozzle included in the jet engine in an embodiment of the present invention.

FIG. 2A is an entire diagram of the jet flow nozzle 60 viewed from the jet flow injecting side. FIG. 2B is an enlarged view of a region A of FIG. 2A. FIG. 3 is an enlarged perspective view of the jet engine 10 including the jet flow nozzle 60.

As shown in the drawings, the jet flow nozzle 60 in the present embodiment is formed by a cylindrical partition having a nozzle outlet end 61 and injects the jet flow from the nozzle outlet end 61.

The jet flow nozzle 60 in the present embodiment includes a plurality of protrusions 1 that are formed on an inner wall surface of the cylindrical partition and are provided around the Reynolds outlet end 61 at equal intervals.

The protrusions 1 bend (see FIG. 4) a mixed layer formed in a boundary region between the jet flow and the external air flow (a flow of external air flowing from the outside of the jet flow nozzle 60) when viewed from the jet flow injecting side, and prevent the velocity gradient of the fluid in the mixed layer from increasing.

More specifically, when there is no protrusion 1, the shape of the mixed layer is circular, similar to the nozzle outlet end 61. However, the parts around the protrusions 1 are bent so as to enter the inside of the circular shape from the circumference due to the presence of the protrusions 1. The mixed layer is bent by the protrusions 1, and thus, the mixed layer when viewed from the jet flow ejecting side appears to become thick. In this manner, the mixed layer when viewed from the jet flow ejecting side appears to become thick, and thus, compared to a case in which there is no protrusion 1 and the mixed layer is not bent, the velocity gradient in the mixed layer becomes gentle, which prevents the increase in the velocity gradient. Accordingly, shear force in the mixed layer is reduced.

Figure 4:
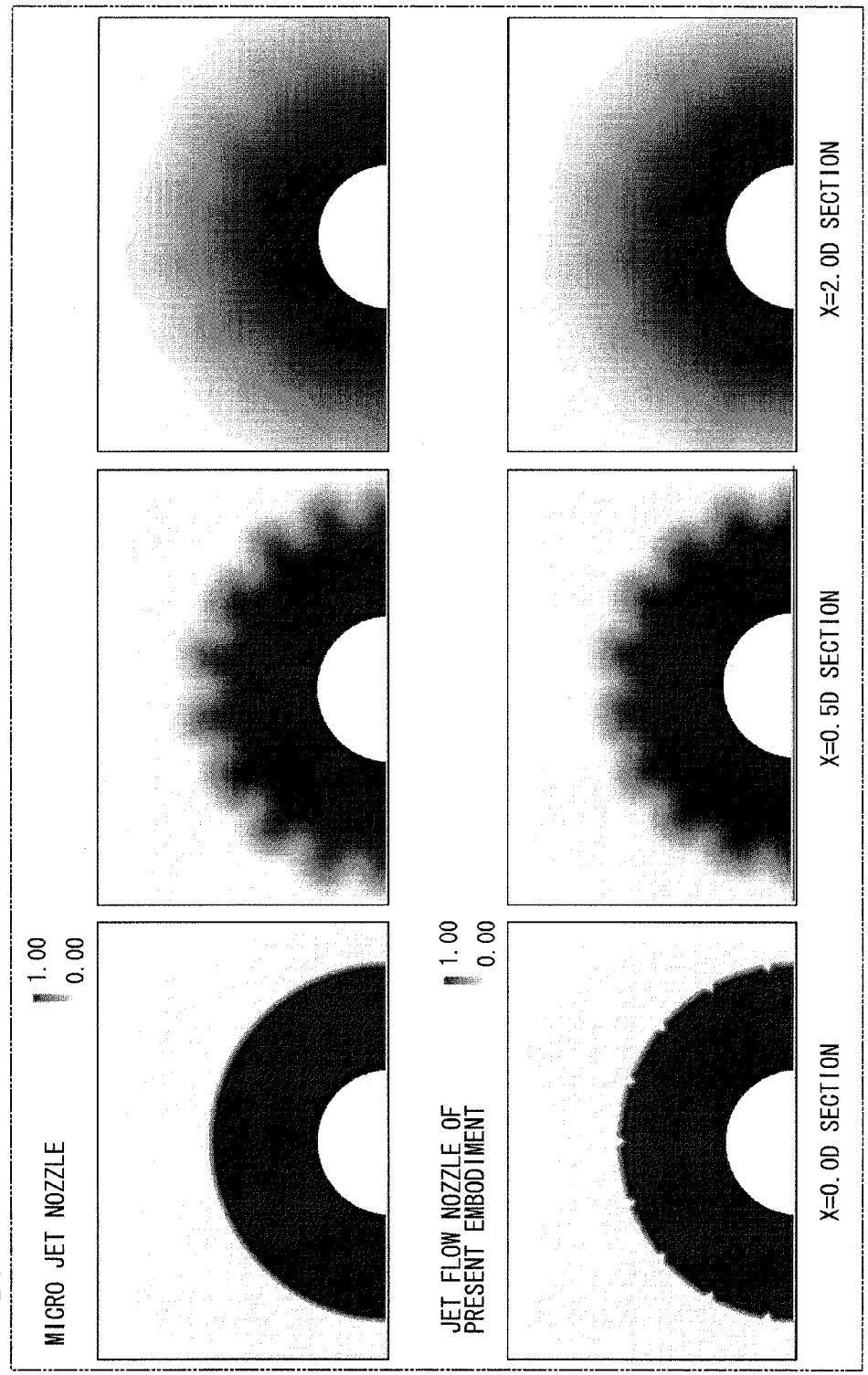
FIG. 4 is a simulation result of a non-dimensional velocity distribution of a case in which a micro jet nozzle is used and a case in which the jet flow nozzle is used in an embodiment of the present invention.

In the present embodiment, the plurality of protrusions 1 are provided around the nozzle outlet end 61 at equal intervals. For this reason, as shown in FIG. 4, the shape of the mixed layer becomes a repeatedly wavy and curved shape along the circumference of the original nozzle outlet end 61.

In the present embodiment, the number of protrusions 1 is only as much as the bending number of the mixed layer in all regions of the entire circumference when viewed from the jet flow injecting side. Specifically, the eighteen protrusions 1 are placed at equal intervals. In addition, the number of protrusions 1 does not necessarily need to be eighteen, but is preferably about eighteen to twenty-four. In addition, if the number of protrusions 1 is less than eighteen, the mixed layer is not sufficiently bent, and the Reynolds stress reduction effect is obtained but is not sufficient.

Each of the protrusions 1 has a triangular pyramid shape that protrudes radially toward the center of the nozzle outlet end 61 when viewed from the jet flow injecting side. A height d (see FIG. 2B) of each protrusion 1 at the nozzle outlet end 61 is 2.5 to 3.0% of the diameter of the nozzle outlet end so as to be about twice the thickness of the mixed layer at the nozzle outlet end 61.

In this manner, the reason for setting the height of the protrusion 1 at the nozzle outlet end 61 to about twice the thickness of the mixed layer is because the momentum of the fluid is less than the mainstream of the mixed layer, and thus, when the height of the protrusion 1 is smaller than the mixed layer, the momentum of the fluid is changed by the protrusions 1, and the effect of curved flow cannot be obtained. Thus, the height of the protrusion 1 needs to be sufficiently greater than the thickness of the mixed layer in at the nozzle outlet end 61.

The depth (a length of the jet flow in the flow direction) of the protrusions 1 is preferably about twice the height d. The reason for this is that, if the protrusion 1 enters inside the nozzle inner wall by about 30°, the effect of the curved flow can be easily obtained at the point in which the mixed layer starts.

As shown in FIG. 2B, the jet flow nozzle 60 in the present embodiment includes grooves 2 continuously reaching the nozzle outlet end 61 according to the protrusions 1 on the outside of the cylindrical partition. That is, the grooves 2 are provided outside the protrusions 1 in the radial direction of the nozzle outlet end 61.

The protrusions 1 and grooves 2 can be formed in one process by preparing the jet flow nozzle not provided with the protrusions 1 and the grooves 2 and performing the processing of forming a notch near the nozzle outlet end of the jet flow nozzle.

According to the jet flow nozzle 60 in the present embodiment, the mixed layer of the jet flow and the external air flow is bent by the protrusions 1 when viewed from the jet flow injecting side, the velocity gradient of the fluid in the mixed layer becomes gentle, and thus the increase in the velocity gradient can be prevented. For this reason, like the law of noise reduction using the micro jet nozzle, the reduction of shear force in the mixed layer is promoted by bending the mixed layer of the jet flow and the external air flow, the growth of a vortex formed near the nozzle outlet end 61 is suppressed, and thus it is possible to suppress the occurrence of a large vortex that is the main cause of noise. That is, according to the jet flow nozzle 60 in the present embodiment, it is possible to reduce the low-frequency noise emitted in the past as in the micro jet nozzle.

FIG. 4 is a simulation result of a non-dimensional velocity distribution in the case in which the micro jet nozzle is used and the case in which the jet flow nozzle 60 is used in the present embodiment. The non-dimensional velocity distribution shows the shape of the mixed layer.

In FIG. 4, reference numeral X indicates a separation distance from the nozzle outlet end to the injection direction of the jet flow, and D indicates the diameter of the nozzle outlet end. The number of micro jet nozzles is eighteen like those of the protrusions. In addition, a flow ratio of air injected from the micro jet nozzle to the jet flow is 0.6%.

As will be understood from FIG. 4, the shape of the mixed layer when the jet flow nozzle 60 of the present embodiment is used is very similar to that of the mixed layer when the micro jet nozzle is used. That is, by using the jet flow nozzle 60 of the present embodiment, the mixed layer can be bent as in the case of using the micro jet nozzle.

Figure 5:
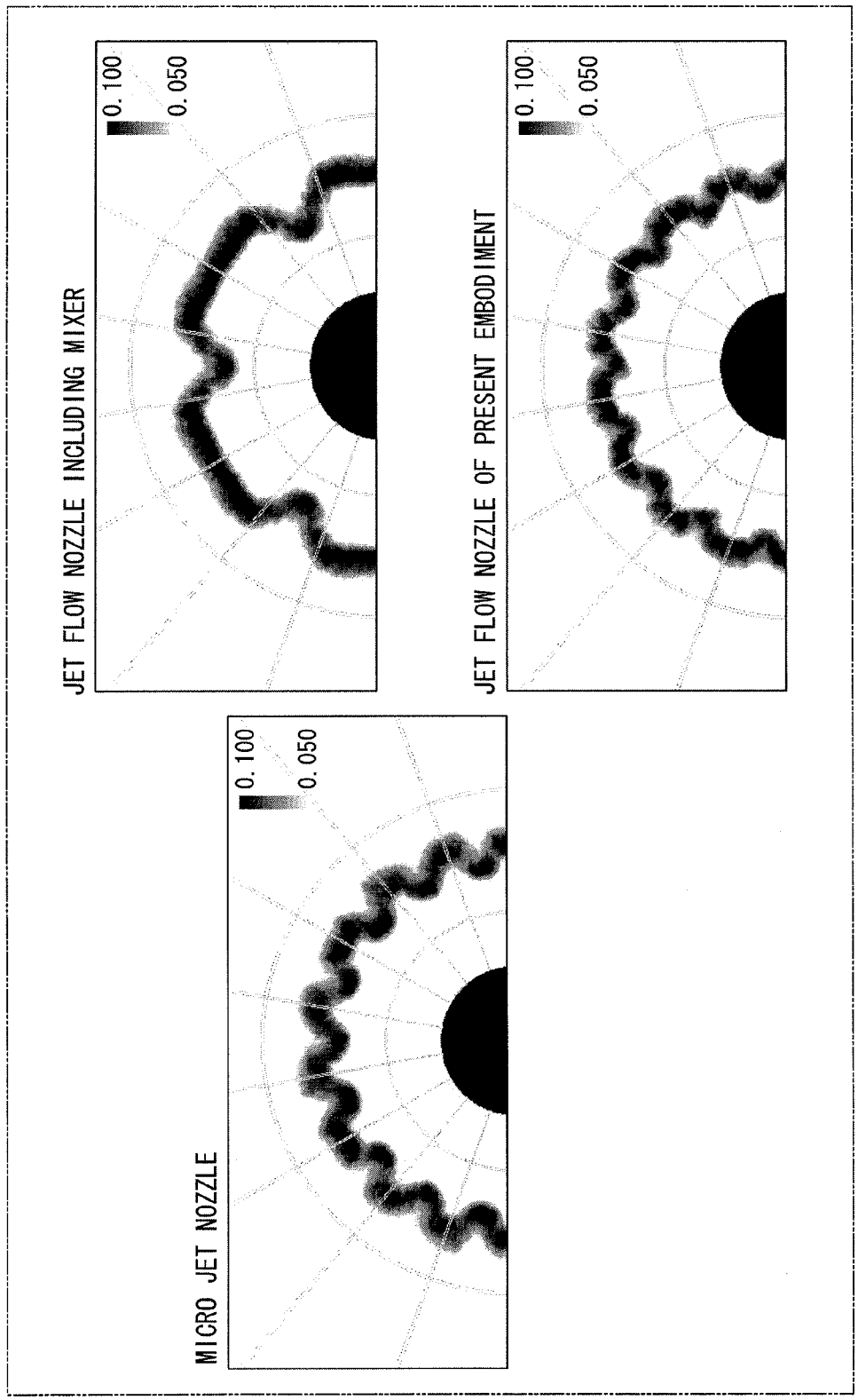
FIG. 5 is a simulation result of a Reynolds stress distribution of a case in which the micro jet nozzle is used, a case in which the jet flow nozzle including the mixer is used, and a case in which the jet flow nozzle is used in an embodiment of the present invention.

FIG. 5 is a diagram showing a Reynolds stress distribution when the separation distance X from the nozzle outlet end to the injection direction of the jet flow is 0.4 D in the simulation of FIG. 4.

As will be understood from FIG. 5, the shape of the mixed layer when the jet flow nozzle 60 of the present embodiment is used is very similar to that of the mixed layer when the micro jet nozzle is used. That is, by using the jet flow nozzle 60 of the present embodiment, the mixed layer can be bent as in the case of using the micro jet nozzle.

From the simulation results shown in FIGS. 4 and 5, it was found that the mixed layer could be bent as in the case of using the micro jet nozzle by using the jet flow nozzle 60 of the present embodiment, and thus the low-frequency noise could be reduced as in the micro jet nozzle. In the jet flow nozzle 60 of the present embodiment, the bending of the mixed layer is performed by the protrusions 1 provided in the jet flow nozzle 60.

Figure 12:
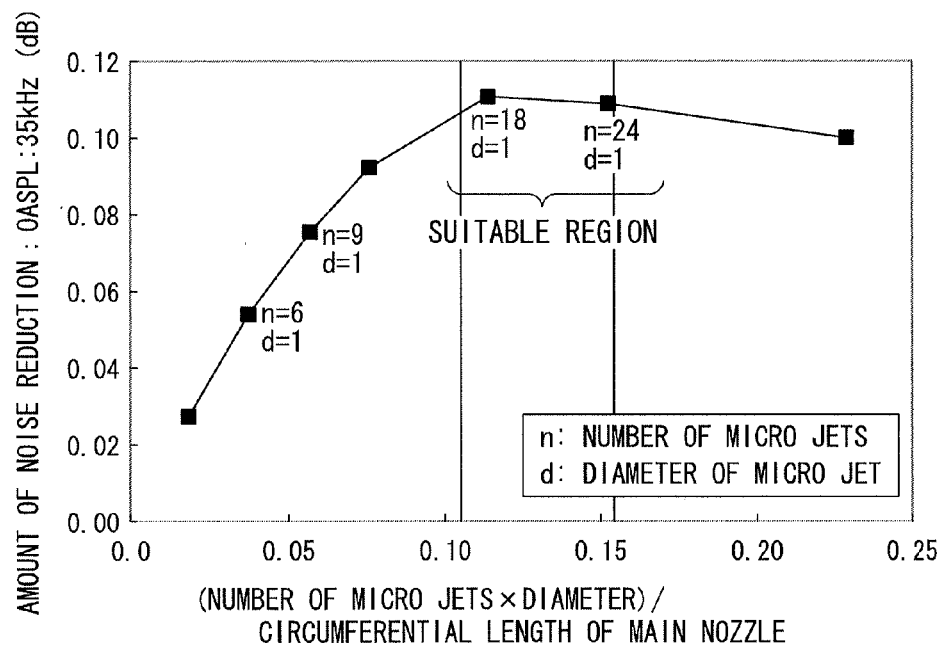
FIG. 12 is a graph showing a relationship between the number of micro jets installed and an amount of noise reduction in the micro jet nozzle of the related art.

FIG. 12 shows a graph showing a relationship between the number of micro jets installed in the micro jet nozzle described in Non-Patent Documents 2 and 3, and the amount of noise reduction. In FIG. 12, a horizontal axis indicates a non-dimensional number obtained by dividing a numerical value, which is obtained by multiplying the diameter of the micro jet by the number of installed micro jets, by the circumferential length of a main nozzle provided with the micro jet. A vertical axis thereof indicates a numerical value which indicates an overall sound pressure level (OASPL) as the amount of noise reduction in decibels (dB). A greater value of the amount of noise reduction shown on the vertical axis of FIG. 12 indicates that the amount of noise reduction is large and it is quiet. In FIG. 12, concerning numerical values attached to the side of the sign, n indicates the number of installed micro jets, and d indicates the diameter of the micro jet. The non-dimensional number shown in the horizontal axis of FIG. 12 indicates a geometric proprietary ratio of the micro jet to the main nozzle and is a variable of the number and the diameter of the installed micro jets. However, in FIG. 12, in order to clarify only the influence of the number of micro jets to the amount of noise reduction (OASPL), the diameter of the micro jet is constant (d=1).

As will be understood from FIG. 12, when setting the diameter of the micro jet to a constant value and changing the number thereof, it is found that the amount of noise reduction (OASPL) indicates the maximum value in the range of the number of micro jets n=18 to 24. That is, in the micro jet nozzle, when the diameter of the micro jet nozzle is not changed, the noise is reduced most under the conditions of the numbers of 18 to 14, and it is quiet. If the number of protrusions 1 in the present embodiment is equal to or greater than six, the effect can be obtained. However, the optimal number thereof is considered to be more preferably 18 to 24, when referring to the effect of the micro jet nozzle shown in the prior documents (Non-Patent Documents 2 and 3) shown in FIG. 12. That is, even in the jet flow nozzle 60 of the present embodiment, the noise is considered to be reduced most under the conditions of the number of protrusions 1 of 18 to 24 and it is quiet.

Figure 6A:
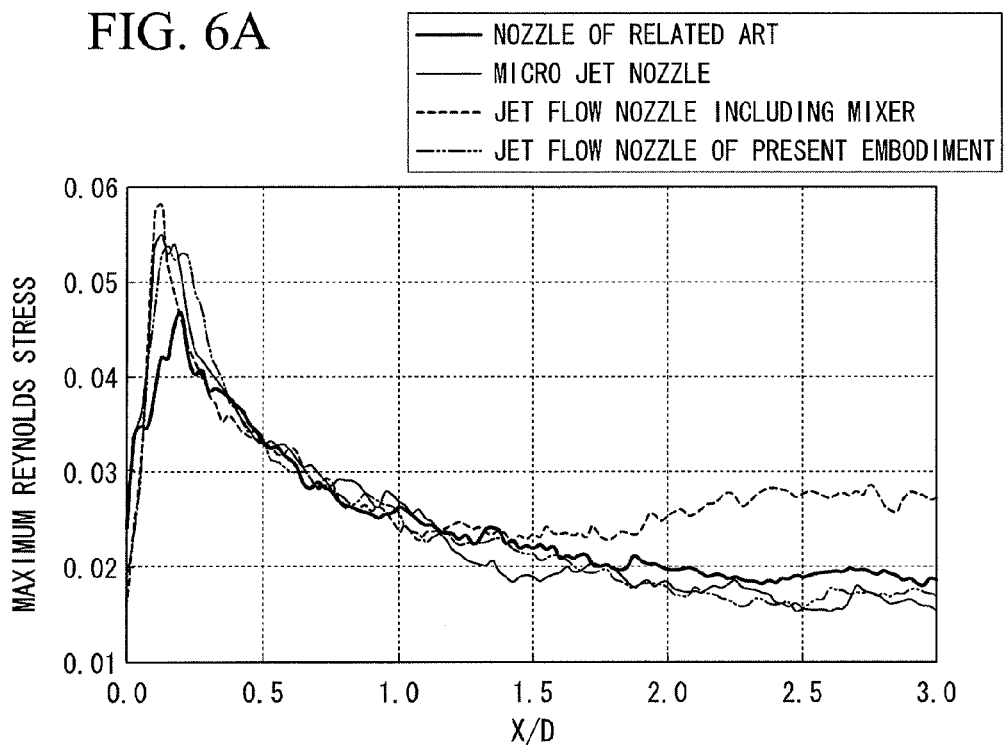
FIG. 6A is a graph of a maximum Reynolds stress distribution of a case in which the micro jet nozzle is used, a case in which the jet flow nozzle including the mixer is used, and a case in which the jet flow nozzle is used in an embodiment of the present invention, showing that a ratio of a separation distance from a nozzle outlet end in an injection direction of the jet flow to a diameter of the nozzle outlet end is in a range of 0.0 to 3.0.
Figure 6B:
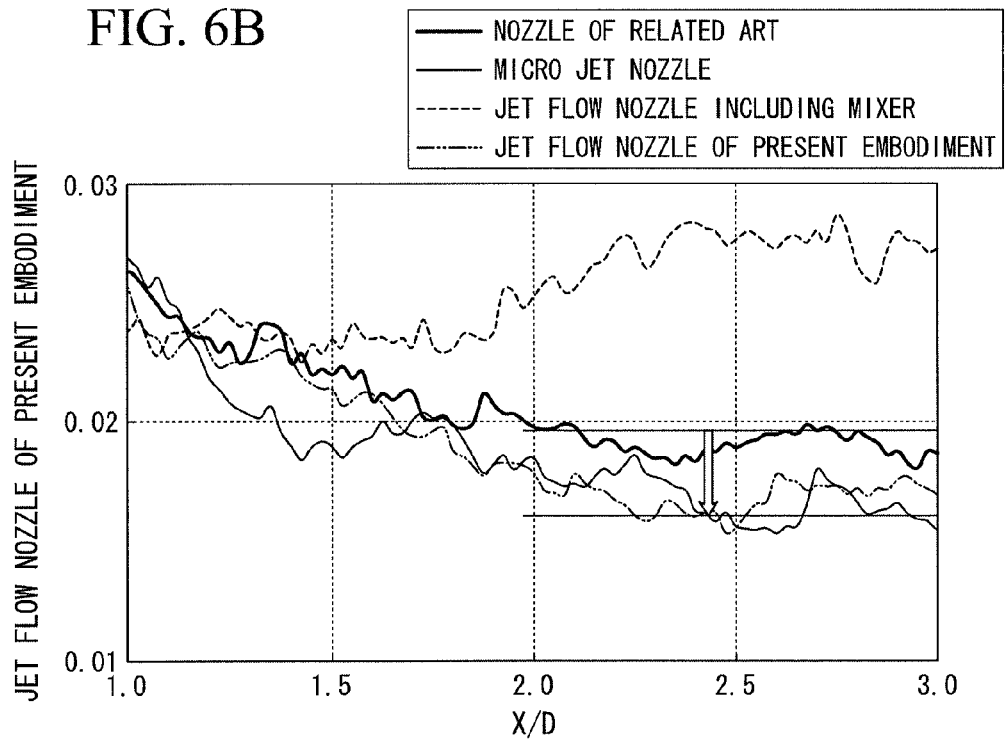
FIG. 6B is a graph of a maximum Reynolds stress distribution of a case in which the micro jet nozzle is used, a case in which the jet flow nozzle including the mixer is used, and a case in which the jet flow nozzle is used in an embodiment of the present invention, showing that a ratio of the separation distance from the nozzle outlet end in the injection direction of the jet flow to the diameter of the nozzle outlet end is in a range of 1.0 to 3.0.

FIGS. 6A and 6B are simulation results showing a change in maximum Reynolds stress in the case in which the nozzle (the nozzle not having the micro jet nozzle, the mixer, and the protrusions) of the related art is used, the case in which the micro jet nozzle is used, the case in which the jet flow nozzle including the mixer is used, and the case in which the jet flow nozzle of the present embodiment is used.

In FIGS. 6A and 6B, a ratio of the separation distance X from the nozzle outlet end to the injection direction of the jet flow to the diameter D of the nozzle outlet end is indicated on a horizontal axis, and the maximum Reynolds stress is indicated on a vertical axis. FIG. 6A shows that the ratio of the separation distance X from the nozzle outlet end to the injection direction of the jet flow to the diameter D of the nozzle outlet end is in the range of 0.0 to 3.0. FIG. 6B shows that the ratio of the separation distance X from the nozzle outlet end to the injection direction of the jet flow to the diameter D of the nozzle outlet end is in the range of 1.0 to 3.0.

From FIGS. 6A and 6B, it is understood that, when the micro jet nozzle and the jet flow nozzle 60 of the present embodiment are used, the maximum Reynolds stress (the low-frequency noise) can be reduced compared to the case in which the jet flow nozzle including the mixer is used, and the maximum Reynolds stress (the low-frequency noise) can be reduced compared to the nozzle of the related art.

Figures 7, 8:
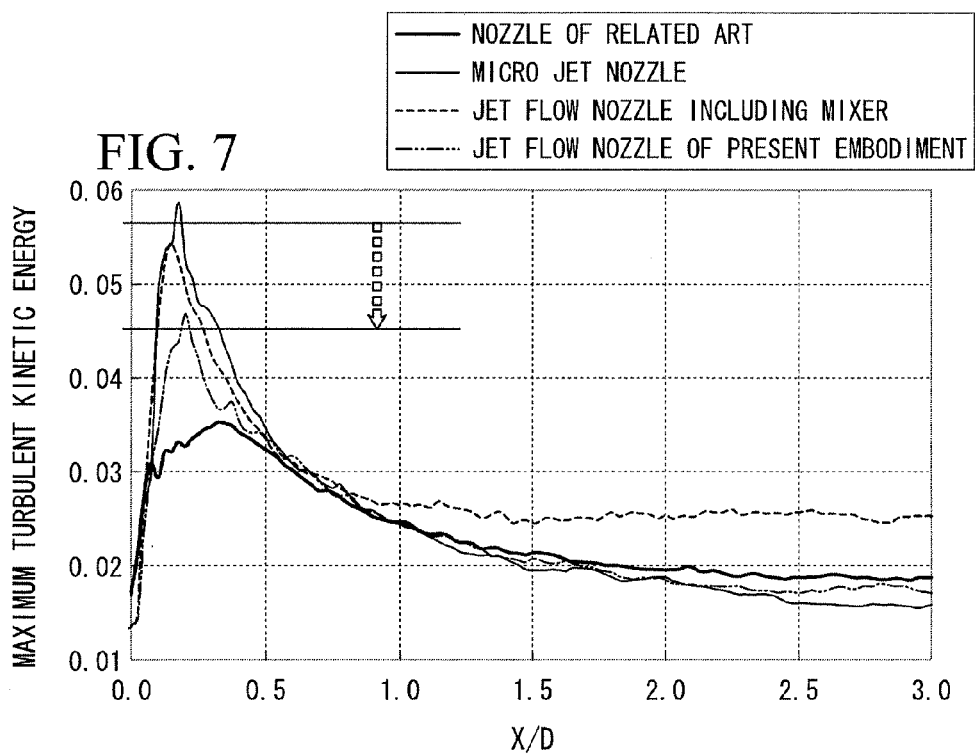
FIG. 7 is a graph of maximum turbulent kinetic energy in the case in which the micro jet nozzle is used, the case in which the jet flow nozzle including the mixer is used, and the case in which the jet flow nozzle is used in an embodiment of the present invention.
FIG. 8 is a diagram showing a result of a noise test in the case in which the micro jet nozzle is used and the case in which the jet flow nozzle including the mixer is used.

FIG. 7 is a simulation result showing a change in maximum turbulent kinematic energy in the case in which the nozzle of the related art is used, the case in which the micro jet nozzle is used, the case in which the jet flow nozzle including the mixer is used, and the case in which the jet flow nozzle of the present embodiment is used.

In FIG. 7, a ratio of the separation distance X from the nozzle outlet end to the injection direction of the jet flow to the diameter D of the nozzle outlet end is indicated on a horizontal axis, and maximum turbulent kinematic energy is indicated on a vertical axis.

From FIG. 7, it is understood that, when the jet flow nozzle 60 of the present embodiment is used, it is possible to significantly reduce the maximum turbulent kinematic energy immediately after the nozzle outlet end compared to the cases in which the micro jet nozzle and the jet flow nozzle including the mixer are used.

A result of a noise test of the jet flow nozzle including the mixer and the jet flow nozzle 60 of the present embodiment is shown in FIG. 8. The noise test was performed by measuring the noise for each of the jet flow nozzle including the mixer and the jet flow nozzle 60 of the present embodiment on the engine side and downstream from the engine.

As shown in FIG. 8, although the effect of noise reduction is found downstream from the engine in the jet flow nozzle including the mixer, the noise on the side of the engine is loud, and the effect of noise reduction on the side of the engine is not found. On the other hand, in the jet flow nozzle 60 of the present embodiment, the sound of the side of the engine is not loud, and the effect of noise reduction on the side of the engine is found.

Maximum turbulent kinetic energy immediately after the nozzle outlet end is considered to be proportional to the magnitude of the high-frequency noise. Accordingly, in the jet flow nozzle 60 of the present embodiment, maximum turbulent kinetic energy immediately after the nozzle outlet end can be significantly reduced compared to the case in which the jet flow nozzle including the mixer is used. Thus, the high-frequency noise, that is, the noise of the nozzle outlet end, is considered to be significantly reducible.

Figure 9:
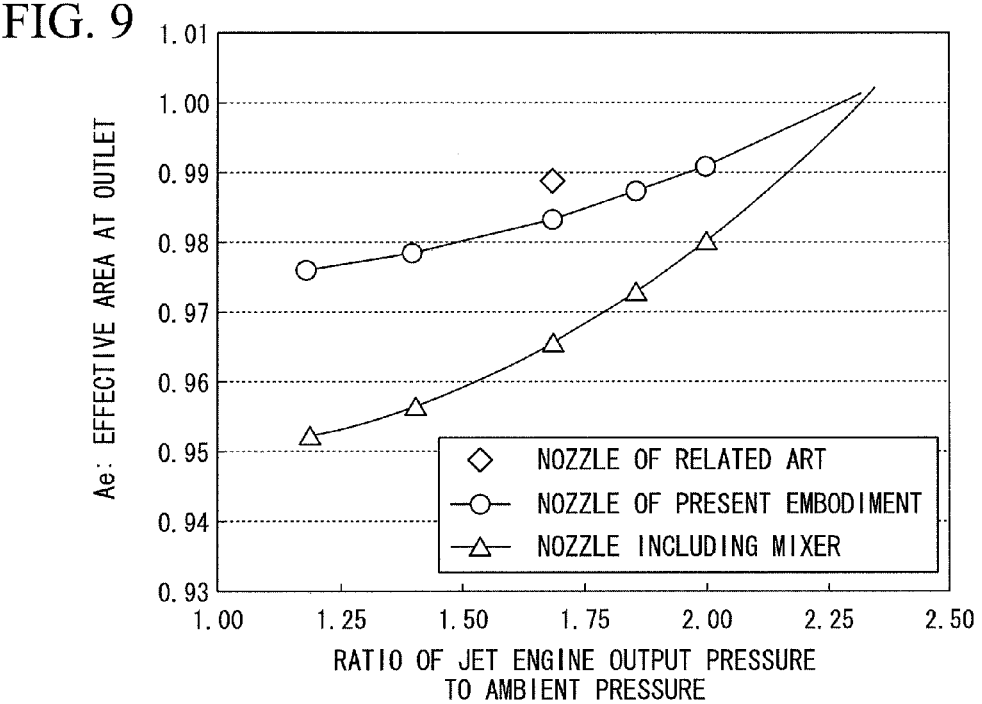
FIG. 9 is a graph showing a comparison of the jet engine nozzle performance between the jet flow nozzle included in the jet engine in an embodiment of the present invention and a jet flow nozzle including a nozzle and a mixer of the related art.
Figure 10:
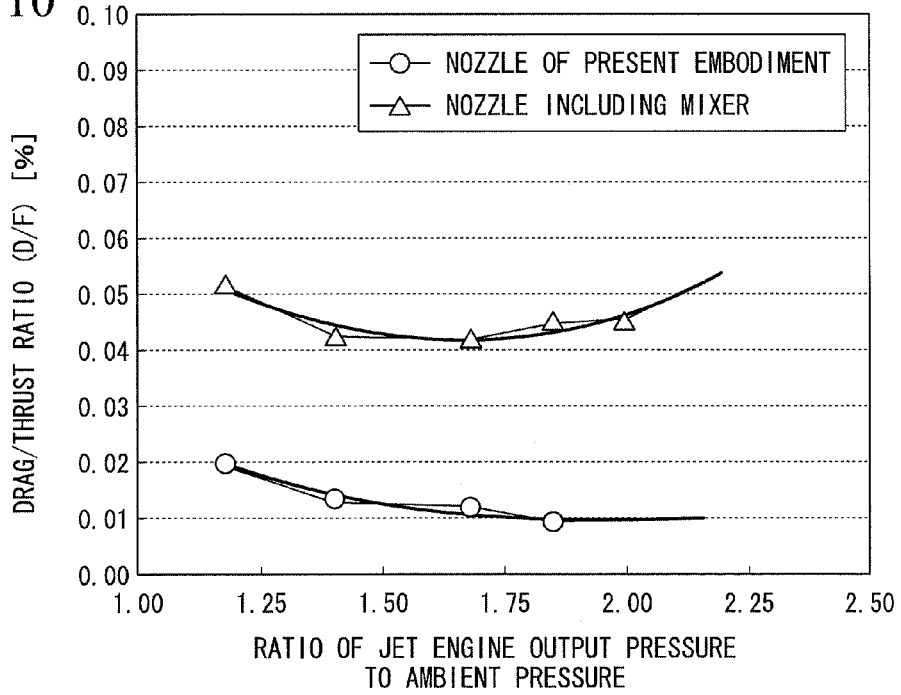
FIG. 10 is a graph showing a comparison of thrust loss between the jet flow nozzle included in the jet engine according to an embodiment of the present invention and the jet flow nozzle including the mixer.

Next, an influence on the jet flow nozzle 60 of the present embodiment on the jet engine nozzle performance and the thrust loss will be verified based on FIGS. 9 and 10. FIG. 9 is a graph showing a comparison of the jet engine nozzle performance between the jet flow nozzle 60 of the present embodiment and the jet flow nozzle including the nozzle and the mixer of the related art. FIG. 10 is a graph showing the comparison of thrust loss between the jet flow nozzle 60 of the present embodiment and the jet flow nozzle including the mixer.

In FIG. 9, a horizontal axis indicates operation conditions of the engine using a ratio of a jet engine outlet pressure to an ambient pressure. A vertical axis indicates an effective area at exit (Ae) that is an index of jet engine nozzle performance. In FIG. 9, in order to verify the influence of the type of the jet flow nozzle on the jet engine performance, the jet flow nozzle including the nozzle and the mixer of the related art is compared to the jet flow nozzle 60 of the present embodiment. A conical nozzle is used as the nozzle of the related art. A chevron nozzle with a serrated outlet is used as the jet flow nozzle including the mixer.

As shown in FIG. 9, performance of the jet flow nozzle (the chevron nozzle) including the mixer is significantly lower than that of the nozzle of the related art (the conical nozzle) showing performance of the current engine. Thus, it is found that there is a problem in that, in the jet flow nozzle including the mixer, if a performance correction is not added, an engine obtaining the output as designed is not provided, a design cycle is increased, and the cost is increased. On the other hand, in the jet flow nozzle 60 of the present embodiment, the engine performance remains at a position close to the nozzle of the related art that is the current engine performance. Accordingly, in the jet flow nozzle 60 of the present embodiment, it can be understood that an influence on the performance design is small, and it is possible to obtain the output as designed.

In FIG. 10, a horizontal axis indicates an evaluation condition of thrust loss, and the horizontal axis indicates the operation condition of the engine as in FIG. 9 using a rate of the jet engine outlet pressure and the ambient pressure. A vertical axis indicates a ratio D/F (%) of drag applied to the engine to thrust, which is an index of thrust loss. In FIG. 10, in order to verify the influence of the type of the jet flow nozzle on performance of the jet engine, the jet flow nozzle including the mixer is compared to the jet flow nozzle 60 of the present embodiment. As in FIG. 9, the chevron nozzle with a serrated outlet is used as the jet flow nozzle including the mixer.

Concerning the thrust loss of the jet engine, the resistance is small as the index of D/F (%) is close to zero, and thrust loss is small. In the conical nozzle that is the nozzle of the related art, D/F (%) is nearly 0. D/F (%) of the jet flow nozzle (the chevron nozzle) including the mixer remains at 0.04 to 0.05, and it is understood that the resistance is large and thrust loss is numerous. This is considered to be caused by an excessive pressure difference generated by narrowing the jagged protrusions of the serrated outlet on the inside of the engine in the jet flow nozzle (the chevron nozzle) including the mixer, which becomes resistance force of the engine propulsion. On the other hand, in the jet flow nozzle 60 of the present embodiment, D/F (%) is 0.01 to 0.02, which is considerably lower than that of the jet flow nozzle (the chevron nozzle) including the mixer. Accordingly, it is understood that the jet flow nozzle 60 of the present embodiment has less thrust loss.

In this manner, according to the jet flow nozzle 60 of the present embodiment, the noise is reduced in the same manner as when the micro jet in the low frequency is used, and thus it is possible to reduce the noise compared to when the jet flow nozzle including the mixer in the high frequency is used or when the micro jet nozzle is used. For that reason, it is possible to realize a reduction of noise greater than or equal to that in the case in which the micro jet nozzle is used.

According to the jet flow nozzle 60 in the present embodiment, the reduction of noise mentioned above is realized by the protrusions 1. For this reason, it is possible to promote the reduction of noise by the simpler configuration than when the micro jet nozzle is used.

Since the reduction of noise is realized by the protrusions 1 and there is no need to bleed air from the jet engine, it is possible to eliminate the cause of thrust loss when the micro jet nozzle is used. Furthermore, in the jet flow nozzle 60 in the present embodiment, in order to promote the reduction of noise by bending the mixed layer, there is no need to slow down the jet flow, and it is also possible to eliminate the cause of thrust loss when the jet flow nozzle including the mixer is used.

As mentioned above, according to the jet flow nozzle 60 in the present embodiment, in the jet engine, through the simple configuration, it is possible to realize the reduction of noise greater than or equal to that when the micro jet nozzle is used and reduce thrust loss.

In the jet flow nozzles 60 in the present embodiment, the protrusions 1 are placed as much as the bending number of the mixed layer in all regions of the entire circumference. For this reason, it is possible to reduce the velocity gradient in all regions of the mixed layer by bending the mixed layer in all regions.

Thus, according to the jet flow nozzle 60 of the present embodiment, the effect of noise reduction can be further enhanced.

In the jet flow nozzle 60 of the present embodiment, the grooves 2 continuing to the nozzle outlet end 61 are included on the outside of the protrusions 1 in the radial direction.

For this reason, it is possible to effectively bend the mixed layer by drawing the external air flow along the grooves 2. Thus, it is possible to effectively bend the mixed layer by the smaller protrusions 1, the protrusions 1 are prevented from serving as the obstacles of the jet flow, and thus thrust loss can be further reduced.

Hereinafter, while the preferred embodiments of the present invention has been described with reference to the drawings, the present invention is not limited to the embodiment mentioned above. Various shapes, combinations or the like of each component shown in the embodiment mentioned above are an example, and various modifications can be made based on design requirements or the like without departing from the spirit and scope of the present invention.

For example, in the embodiment mentioned above, a configuration having the protrusions 1 and the grooves 1 of the triangular pyramid shape has been described.

Figure 11:
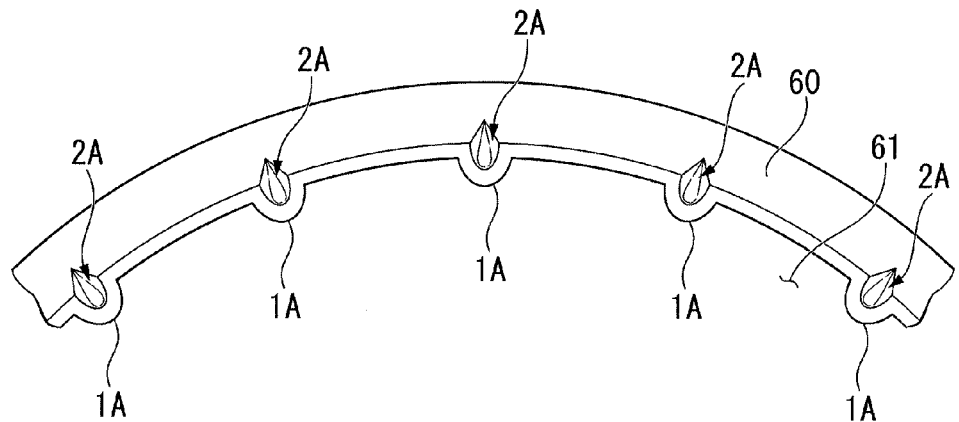
FIG. 11 is a diagram in which the jet flow nozzle is viewed from a jet flow ejecting side in a modified example of the jet flow nozzle included in the jet engine in an embodiment of the present invention.

However, the present invention is not limited thereto, but, as shown in FIG. 11, a configuration including conical protrusions 1A and grooves 2A may be adopted.

[Industrial Availability]

According to the present invention, in the jet engine, through a simple configuration, it is possible to realize the reduction of noise greater than or equal to that in which the micro jet nozzle is used, and reduce thrust loss.

[Description of Reference Numerals And Signs]

1, 1A: protrusions
2, 2A: grooves
10: jet engine
60: jet flow nozzle
61: nozzle outlet end

The invention claimed is:

1. A jet flow nozzle which is mounted on a jet engine and injects a jet flow to an outside, the jet flow nozzle comprising:
a nozzle outlet end that injects the jet flow, wherein the jet flow comprises a fan bypass airflow and a core exhaust airflow;
protrusions that are provided around the nozzle outlet end, wherein the protrusions have a triangular pyramid shape that protrudes radially toward a center of the nozzle outlet end, wherein each protrusions has a height of 2.5 to 3.0% of a diameter of the nozzle outlet end.

2. The jet flow nozzle according to claim 1, wherein the protrusions are provided around the nozzle outlet end from which the jet flow is injected, and a bended mixed layer is placed in all areas of an entire circumference of the nozzle outlet end.

3. The jet flow nozzle according to claim 2, wherein at least six protrusions are provided around the nozzle outlet end from which the jet flow is injected.

4. The jet flow nozzle according to claim 3, wherein eighteen to twenty-four protrusions are provided around the nozzle outlet end from which the jet flow is injected.

5. The jet flow nozzle according to claim 2, wherein grooves continuing to the nozzle outlet end are provided on an outside of the protrusions in the radial direction.

6. The jet flow nozzle according to claim 2, wherein the height of each protrusion is greater than a thickness of the bended mixed layer at the nozzle outlet end.

7. A jet propulsion device comprising: a jet engine including a jet flow nozzle according to claim 1.

8. A method of noise reduction of a jet flow nozzle according to claim 1 which is mounted on the jet engine and injects the jet flow to the outside, the method comprising:
thickening a mixed layer of the jet flow and an external air flow, when viewed from a side of the jet flow injected, by protrusions bending the mixed layer.

9. The method according to claim 8, wherein a bended mixed layer is placed in all areas of an entire circumference of the nozzle outlet end.

10. The method according to claim 9, wherein at least six protrusions are provided around the nozzle outlet end from which the jet flow is injected.

11. The method according to claim 10, wherein eighteen to twenty-four protrusions are provided around the nozzle outlet end from which the jet flow is injected.

12. The method according to claim 9, wherein grooves continuing to the nozzle outlet end are provided on an outside of the protrusions in the radial direction.

13. The method according to claim 9, wherein the heights of each protrusion is greater than a thickness of the bended mixed layer at the nozzle outlet end.

* * * * *